United States Patent Office 3,278,435
Patented Oct. 11, 1966

3,278,435
LUBRICANT GREASE
Fred K. Kawahara, Park Forest, Ill., assignor to Standard Oil Company, Chicago, Ill., a corporation of Indiana
No Drawing. Filed Oct. 31, 1963, Ser. No. 320,541
6 Claims. (Cl. 252—49.6)

The present invention relates to novel lubricant greases and to the method of preparing the same. More particularly, the present invention relates to novel greases wherein the lubricating vehicle is prepared to contain organosilicon compounds.

Very high temperatures resulting from high speed operation of machines, engines, etc., have resulted in a great need for lubricant greases which are stable at temperatures of 600° F. and higher. This need is especially pronounced in applications where lightly loaded bearings are used to control motors for sonic and/or supersonic aircraft and spacecraft, both manned and unmanned. Requirements of lubricants for applications of this type have grown more and more difficult to fulfill as the temperatures encountered have become progressively higher. Progress in the art, however, has led to development of greases which are capable of withstanding relatively high temperatures, e.g.. about 400 to 450° F. This has been made possible through development of new thickening agents having special properties because the thickeners often used in lower temperature applications, such as lithium soaps of high molecular weight carboxylic acids and the like, are unsuitable at the higher temperatures. Typical of the thickening agents developed to meet the requirements of high temperature applications are ammeline, the arylurea thickeners described in U.S. 2,710,839, U.S. 2,710,840 and U.S. 2,710,841 and the ureido thickeners described in U.S. 3,015,625. When the need arose for greases stable at temperatures as high as 600° F., it was soon discovered that although known thickening agents were suitable for use at temperatures in this range, the lubricant vehicles known to the art possess various shortcomings making them disadvantageous for use in high temperature applications.

According to the present invention, it has now been found that a lubricant grease suitable for use in applications at elevated temperatures in the range of 600° F. and higher is formulated from thickening agents known to the art, and a lubricant vehicle made from silicone polymer oils admixed with at least one polyphenyl cyclic polysiloxane compound. Additionally, it is to be expected that such a grease composition will be effective at temperatures much higher than 600° F. in particular situations where pressure is reduced such as, for example, in lightly loaded bearings used to control motor for spacecraft operating outside the earth's atmosphere under conditions of essential vacuum.

Cyclic phenylsiloxanes to be employed in the practice of this invention are those having substantially no residual functionality. A polysiloxane has no residual functionality, for purposes of the present invention, when it has substantially no tendency to react further with itself or other siloxanes because of the presence of unreacted —OH groups.

The cyclic phenylsiloxanes of the present invention are further described as even numbered ring compounds having alternating silicon and oxygen atoms with each silicon atom being di-phenyl substituted. Illustrative of these materials are the six and eight member ring compounds, i.e., hexaphenylcyclotrisiloxane and octaphenylcyclotetrasiloxane. These phenyl-substituted cyclic siloxane compounds are generally speaking chemically and thermally stable. For example, the phenyl-substituted cyclic polysiloxanes will typically melt at elevated temperatures in the range of 300 to 500° F. Specifically, the hexaphenylcyclotrisiloxane melts at 376° F. and the octaphenylcyclotetrasiloxane melts at 396–400° F. These properties make them excellent for use in high temperature grease formulations both in small amounts as additives and in larger amounts together with silicon polymer oils as the lubricant vehicle.

Diphenyl dihydroxy siloxane is used to prepare both hexaphenylcyclotrisiloxane and octaphenylcyclotetrasiloxane. The preparation of diphenyl dihydroxy siloxane itself is straightforward. It can be prepared by dropwise addition at room temperature of diphenyl dichlorosilane to an aqueous mixture of toluene and an alcohol such as t-amyl alcohol. Hexaphenylcyclotrisiloxane is prepared by adding concentrated hydrochloric acid to a mixture of diphenyl dihydroxy siloxane in ether followed by a refluxing period which typically is three hours. The product is separated by water washing and conventional recrystallization. Octaphenylcyclotetrasiloxane is typically prepared by adding aqueous sodium hydroxide solution to a mixture of diphenyl dihydroxy siloxane dissolved in ethanol. The mixture is heated at a slightly elevated temperature on the order of 170° F. for a period approximating eight hours after which the product is separated by filtration and water washing.

Conventional silicone polymer oils are used in admixture with polyphenyl cyclic polysiloxanes to provide an effective composition. Typically, these silicone polymer oils will have the following unit structure:

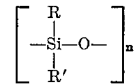

wherein R and R' represent alkyl, aryl, alkylaryl, aralkyl and cycloalkyl groups. Such compounds may be produced by well-known methods, e.g. the hydrolysis of dialkyldichlorosilanes or dialkyldiethoxysilanes. For purposes of the present invention, only those polymers which are high boiling liquids within the lubricating oil viscosity range are suitable, these generally possess a viscosity at 77° F. which is within the range of from about 50 to about 2000 centistokes. Such products are typicaly, colorless and inert, have very low volatility and undergo relatively slight change in viscosity for a given change in temperature. Relatively common oils of this type are dimethylsilicone polymer, phenylmethylsilicone polymer, chlorophenylmethylsilicone polymer, etc., it being preferred to employ the phenylmethylsilicone polymer in accordance herewith. Methods of preparing such compounds are taught in numerous patents, e.g., U.S. 2,410,346, U.S. 2,456,496, and in the literature such as "Chemistry of the Silicones," by Rochow, page 61 et seq.

The preferred silicone polymer oil is a water white phenylmethylsilicone typically having the following properties:

TYPICAL PROPERTIES

| | |
|---|---|
| Color | Water white |
| Viscosity, centistokes at: | |
| 77° F. | 600 |
| 210° F. | 20 |
| Acid number | 0.0 |
| Flash point, ° F. | 610 |
| Fire point, ° F. | 700 |
| Auto ignition temperature, ° F. | 900 |
| Freezing point, ° C. | −5 |
| Specific gravity at 25° C. | 1.115 |
| Refractive index at 25° C. | 1.566 |
| Thermal stability, 8 hrs. at 800° F. (closed glass tube, inert atmosphere): | |
| Fluid appearance | No change |
| Viscosity change at 210° F., percent | 8 |
| Acid number change | 0.0 |
| Volatility at 550° F., percent: | |
| 4 hours | 5 |
| 24 hours | 17 |
| 48 hours | 25 |
| 72 hours | 30 |
| Gel time at 550° F., hours | 600–700 |
| Gas, calculated (molecules of gas per 100 e.v.) | 0.035 |

Polyphenyl cyclic polysiloxane compounds or mixtures thereof will be present in an effective amount and will be admixed with the silicone polymer oil to form the lubricant vehicle. The amount of cyclic phenyl siloxane material used will vary depending upon the particular application. For example, in some instances it is advantageous to employ the cyclic phenyl siloxanes in additive amounts and in other applications it becomes advantageous to employ larger amounts of these materials in admixture with the aforementioned silicon polymer oils as the lubricant vehicle. Because the cyclic phenyl siloxanes are relatively expensive, it will not be practical in most applications to employ these materials in amounts greater than about 70 percent by weight of the total grease formulation. Accordingly, the concentration of polyphenyl cyclic polysiloxane will range broadly from about 0.05 to about 70 percent by weight. Optimally, the cyclic phenyl siloxanes will be present in an amount from about 0.5 to about 50 weight percent with the preferred range being from about 2 to about 50 percent by weight. The silicon polymer oil will be employed in conjunction with the cyclic phenyl siloxanes and typically will be present in an amount from about 10 to about 80 percent by weight with the range from about 20 to about 70 being preferred.

Thickening agents suitable for applications at elevated temperatures in the range of 600° F. and higher may be employed with the polyphenyl cyclic polysiloxane-silicone polymer oil vehicle to provide a lubricant grease composition capable of long term effective operation at elevated temperatures in the range of 600° F. and higher. Suitable thickening agents for such applications include the high melting aromatic ureas, di-ureas, amides and di-amides, all of which contain at least one

radical, wherein R is an aryl radical. Suitable arylcarbamyl compounds have the following empirical structures:

$$RNH\overset{O}{\overset{\|}{C}}NHR' \quad (1)$$

$$RNH\overset{O}{\overset{\|}{C}}NHR''NH\overset{O}{\overset{\|}{C}}NHR' \quad (2)$$

$$R\overset{O}{\overset{\|}{C}}NHR' \quad (3)$$

$$R\overset{O}{\overset{\|}{C}}NHR''NH\overset{O}{\overset{\|}{C}}R' \quad (4)$$

$$RNH\overset{O}{\overset{\|}{C}}R''\overset{O}{\overset{\|}{C}}NHR' \quad (5)$$

wherein R, R' and R'' represent unsubstituted or substituted aryl or alkylaryl radicals containing no more than 12 carbon atoms. With the exception that R'' is necessarily a divalent radical, e.g., phenylene, biphenylene, naphthylene, etc., these radicals may be the same or different, e.g., phenyl, biphenyl, naphthyl, etc., in each compound. The aryl or alkylaryl radicals may be substituted radicals containing various reactive substituents such as hydroxy, carboxy, halo, nitro, etc. The compound should have a melting point in excess of 450° F.

Examples of amides and di-amides which have been found to yield excellent greases when employed as thickeners are N-benzoyl-4-aminobiphenyl, N,N'-dibenzoyl-benzidine, N,N'-dibenzoyl-p-phenylene-diamine and N,N'-bis-(p-nitrobenzoyl)-benzidine. Such compounds may be readily prepared by techniques well known to the art, e.g. by reaction of an aromatic amine or diamine such as phenylene-diamine, aniline, benzidine, etc., with an aroyl halide, e.g. benzoyl chloride. Diamides may be prepared by reacting an aromatic monoamine, e.g. aniline, with an aroyl halide such as a phthalyl chloride, may likewise be employed in accordance herewith. The compounds may be employed alone or in combination to thicken oleaginous vehicles to grease consistency.

Examples of various ureas and di-ureas which have been found useful as thickeners are p-carboxy-1,3-diphenylurea; p-chloro-1,3-diphenylurea; 1,3-di-(1-naphthyl)-urea; 4,4'-bis-[3-(p-biphenylyl)-ureido]-biphenyl; 1-(p-carboxyphenyl) - 3 - (p-biphenylyl)-urea; 1-(p-carboxyphenyl)-3-(o-biphenylyl)-urea; 1,3-di(p-biphenylyl)-urea; 1,3-di-(o-biphenylyl)-urea; 4,4'-bis-(3-phenylureido)-3,3'-dimethoxy biphenyl; p-phenylurethan-1,3-diphenyl-urea; p-cyano - 1,3 - diphenyl - urea; 1-(2,5-dichlorophenyl)-3-phenyl-urea; 4,4' - bis - [3-(2,5-dichlorophenyl)-ureido]-biphenyl; 1,4 - bis - [3-(2-chlorophenyl)-ureido]-benzene; 1,4-bis - [ 3 - (3 - chlorophenyl)-ureido]-benzene; 1,3-bis-[3-(3-chlorophenyl)-ureido]-benzene, and 1,3-bis-[3-(2-chlorophenyl)-ureido]-benzene. Compounds of this type may readily be prepared by reacting an amine or diamine such as aniline, benzidine, phenylenediamine, etc. with an isocyanate or diisocyanate of benzene, diphenyl, etc. It should be understood that the specific arylcarbamyl compounds set forth above are enumerated for purposes of illustration and not of limitation. Compounds of this class may be employed alone or in combination with other such compounds to thicken oleaginous vehicles in accordance herewith.

Superior arylcarbamyl-thickened greases are those ureas (Formula 1 above) and di-ureas (Formula a above) which are prepared from a mixture of two different amines and one diisocyanate or a diamine and two mono-isocyanates, as described in U.S. 2,710,840 and U.S. 2,710,841. Also greases made from bitolylene diisocyanate, p-chloroaniline, and p-toluidine are preferred.

A particularly suitable thickening agent preferred for many applications is a cyanuramide or cyanurodiamide such as ammeline having the formula:

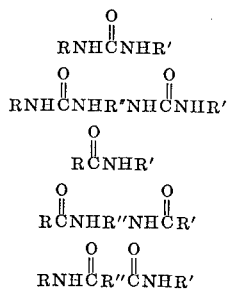

In addition to those thickening agents specifically set forth and included herein, other thickening agents known to the art as suitable for use at elevated temperatures in the range of 600° F. and higher may be employed with lubricant vehicles disclosed herein to make a grease composition suitable for applications at temperatures in their range.

While it is preferred to employ the thickening agents described above to make greases for use at elevated temperatures in the range of 600° F. and higher, in particular applications where temperature requirements are less severe lubricant vehicles within the scope of the present invention may be employed in conjunction with ordinary thickening agents, such as lithium soaps of high molecular weight carboxylic acids and the like, to make grease compositions which are suitable for lower temperature applications.

The thickening agent typically will be present in an amount from about 10 to about 50 weight percent of the total grease composition with the range from about 20 to about 40 being preferred.

It is preferred to make greases within the scope of the present invention by preparing the thickener apart from and then admixing it with the lubricant vehicle followed by milling in a colloid mill, three-roll mill, etc. It has also been found when employing a silicone vehicle that improved properties may be imparted to the grease by "heat-treating" the grease mixture, i.e., subjecting same to a temperature of about 450° F. for at least about half an hour and preferably longer, e.g., from about 1 to 20 hours. Prolonged heating at such temperature may evaporate a portion of the lubricant vehicle; this loss should be replaced and then the mixture should be milled. If desired, the heating and re-addition of vehicle may be repeated before milling. In addition, other methods known to the art may be used to prepare greases within the scope of the present invention so long as the result is an intimate mixture of all ingredients. For example, the thickener may be formed in situ in the oil by introducing the reactants and the desired amount of lubricant vehicle, heating to about 450° F. for a relatively short time, e.g. from about five minutes to an hour to drive off volatile by-products, and then cooling and milling the mixture. As a slight modification, a solvent such as dioxane may be employed as a diluent and mutual solvent for the reactants. The solvent is then evaporated and the grease is milled, etc. substantially as set forth.

The method of forming the thickener in situ in the lubricant vehicle described above is claimed in U.S. 2,710,841.

The following examples are given for the purpose of illustrating the practice of the present invention. However, it is to be understood that these examples are given by way of exemplification only and do not serve to limit in any way the scope of the present invention.

*Example 1*

A lubricant grease was prepared containing 35 percent by weight ammeline and 65 percent by weight Dow Corning silicone polymer oil (QF–6–7024). This grease formulation was tested in a lightly loaded anti-friction bearing operated at a temperature of 600° F., under a 50 pound radial and a 25 pound axial load at a rate of 10,000 r.p.m. The apparatus and test procedures used were in accordance with the Coordinators Research Council Test L–35–59 technique developed and published by the Coordinators Research Council, 30 Rockefeller Plaza, New York 20, N.Y. Five examples of this grease formulation were tested and the hours to failure were noted in each case. The results of these tests are reported in Table 1 as Runs A–E under Example 1.

*Example 2*

Fifty grams of diphenyl dichlorosiloxane in 20 ml. of toluene was added dropwise with added stirring to a mixture of 20 ml. of toluene, 40 ml. of t-amyl alcohol, and 166 ml. of water. Addition took place over a 90 minute period. The white crystalline solids produced were filtered off and water washed to yield 37.2 grams of product which were dissolved and recrystallized from 100 ml. of methylethyl ketone and 95 ml. of chloroform. The product, thus purified, melted at 147° C. Ten grams of this material was then dissolved in 75 ml. of ethanol and heated at 77° C. for 8 hours after addition of 3 drops of aqueous sodium hydroxide solution. Filtration and washing yielded 8.4 grams of white crystalline octaphenylcyclotetrasiloxane product.

A grease formulation was then prepared containing 26 percent by weight octaphenylcyclotetrasiloxane, 39 percent by weight Dow Corning silicone polymer oil (QF–6–7024) and 35 percent by weight ammeline. This grease formultion was tested as described in Example 1. Two runs were made and the test results for these runs are reported as Runs A and B under Example 2 in Table 1.

*Example 3*

A grease formulation was prepared containing 40 percent by weight octaphenylcyclotetrasiloxane, 27 percent by weight Dow Corning silicone polymer oil (QF–6–7024) and 33 percent by weight ammeline. Apparatus and test conditions employed were as described in Example 1. Test results are reported in Table 1.

*Example 4*

Five milliliters of concentrated hydrochloric acid solution were added to a mixture of 30 grams of diphenyl dihydroxy siloxane (prepared as described in Example 2) in 415 ml. of ether. The mixture was refluxed at 90° F. for 3 hours. The ether layer was then water washed and solvent was removed. Twenty-seven grams of a semisolid material were recovered and recrystallized from 150 ml. of ethanol and 10 ml. of benzene. Purified hexaphenylcyclotrisiloxane product melting at 376° F. was then recovered.

A grease formulation was then prepared containing 3.25 percent by weight hexaphenylcyclotrisiloxane, 61.75 percent by weight Dow Corning silicone polymer oil (QF–6–7024) and 35 percent by weight ammeline. Apparatus and test conditions were as described in Example 1. Results are reported in Table 1.

*Example 5*

A grease formulation was prepared containing 3.25 percent by weight octaphenylcyclotetrasiloxane, 61.75 percent by weight Dow Corning silicone polymer oil (QF–6–7024) and 35 percent by weight ammeline. This grease was tested in apparatus and under conditions as described in Example 1. Seven runs were made and the test results for each of these runs are reported in Table 1 as Runs A–G under Example 5.

TABLE 1

| Example No. | Run No. | Hours to Failure |
|---|---|---|
| 1 (Control) | A | 113 |
|  | B | 120 |
|  | C | 110 |
|  | D | 121 |
|  | E | 120 |
| 2 | A | 164 |
|  | B | 179 |
| 3 |  | 169 |
| 4 |  | 164 |
| 5 | A | 180 |
|  | B | 171 |
|  | C | 129 |
|  | D | 134 |
|  | E | 152 |
|  | F | 155 |
|  | G | 181 |

From the foregoing examples, it can readily be seen that the presence of polyphenyl cyclic polysiloxanes contributed to grease formulations which in general could be advantageously used for periods from 50 to 60 hours longer than the control grease formulation containing no polyphenyl cyclic polysiloxanes. This means that the inventive grease formulations have an average life period approximately 40 percent longer than that of the control formulation. Further this means that the inventive grease formulations are particularly well suited for use in high temperature bearing applications.

Thus, having described the invention, what is claimed is:

1. A high temperature grease consisting essentially of ingredients:
   (a) from about 10 to about 80 percent by weight of the total composition of a silicone polymer oil in the lubricating oil viscosity range having a viscosity of from about 50 to about 2,000 centistokes at 77° F.;
   (b) from about 0.05 to about 70 percent by weight of the total composition of a member of the group consisting of hexaphenylcyclotrisiloxane and octaphenylcyclotetrasiloxane; and
   (c) from about 10 to about 50 percent by weight of the total composition of a nitrogen-containing thickening agent of the group consisting of aromatic urea, aromatic di-urea, aromatic amide, aromatic di-amide, abietyl di-urea, cyanuramide and cyanurodiamide.

2. The grease composition of claim 1 wherein ingredient (c) is from about 20 to about 40 percent ammeline.

3. The grease composition of claim 2 wherein the amount of ingredient (a) is from about 10 to about 70 percent.

4. The grease composition of claim 3 wherein the amount of ingredient (b) is from about 2 to about 50 percent.

5. The grease composition of claim 4 wherein ingredient (b) is hexaphenylcyclotrisiloxane.

6. The grease composition of claim 4 wherein ingredient (b) is octaphenylcyclotetrasiloxane.

References Cited by the Examiner

UNITED STATES PATENTS

| | | | |
|---|---|---|---|
| 3,061,545 | 10/1962 | Badger | 252—49.6 |
| 3,088,912 | 5/1963 | Morway et al. | 252—49.6 X |
| 3,103,491 | 9/1963 | Wright | 252—49.6 X |
| 3,160,591 | 12/1964 | Halter et al. | 252—51.5 X |
| 3,192,157 | 6/1965 | Gowdy | 252—49.6 X |

DANIEL E. WYMAN, *Primary Examiner.*

I. VAUGHN, *Assistant Examiner.*